United States Patent Office 2,980,707
Patented Apr. 18, 1961

2,980,707

2,3,4,5-DIEPOXY COMPOUNDS

Paul H. Williams, Orinda, and William J. Sullivan, Oakland, Calif., assignors to Shell Oil Company, a corporation of Delaware No Drawing. Filed June 2, 1958, Ser. No. 738,949

7 Claims. (Cl. 260—348)

This invention relates to novel organic compounds containing a plurality of epoxy groups, and to a process for their preparation. More particularly, the invention relates to the preparation of new and useful diepoxides, and to a method whereby such diepoxides may be prepared from saturated monoepoxides. Still more particularly, the invention relates to novel alpha, beta, gamma, delta-diepoxides, and to their preparation.

In the synthesis of epoxy compounds, that is, those compounds characterized by their inclusion of the epoxy or oxirane ring

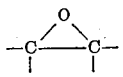

the Darzens condensation is a well-known preparative method. It is particularly useful for the synthesis of alpha, beta, gamma, delta-diepoxy ketones, by the reaction between a monoepoxyaldehyde or ketone and an alpha-haloketone. While such diepoxy ketones are of considerable interest by virtue of their polyfunctionality, their utility is somewhat limited by their admixture with by-products of the synthesis reaction. Such by-products result from the reaction of the product diepoxy carbonylic compound with the haloketone to form additional polyepoxy compounds which are separable from the diepoxy ketone only with difficulty.

Pure polyepoxide compounds are capable of a variety of useful applications. By virtue of their possession of the epoxy ring, they serve as stabilizers to prevent the decomposition of polyvinyl halide plastics through release of halogen radicals. They may also be cured with such agents as acids and amines, by themselves or in combination with other epoxide compounds, to form valuable resinous and coating materials. They may also serve as intermediates in the preparation of a wide variety of such useful organic compounds as pharmaceuticals, insecticides and fire retardants or, by themselves, may be used as solvents, modifiers or plasticizers for synthetic organic plastic materials.

It is an object of this invention to provide a new class of polyfunctional polyepoxy compounds. A further object is the provision of a process for their preparation with a high degree of product purity. Another object of the invention is the provision of a new class of alpha, beta, gamma, delta-diepoxy compounds, and a process for their preparation from saturated monoepoxy ketones or aldehydes. Other objects will be apparent from the following description of the invention.

The novel polyepoxy compounds of the invention are those compounds having a plurality of vicinal epoxy groups, a carbon atom of one of which, and which is not connected to a carbon atom of any other epoxy group, is connected to an electron-withdrawing radical.

These compounds can be best understood by a consideration of the process by which they are prepared—another feature of this invention. That process comprises reacting an epoxy compound having a carbonylic substituent selected from the group of monovalent radicals consisting of formyl and ketonic radicals, with a halomethyl compound having the formula $XCH_2Y$. In that formula, X is a halogen atom, e.g., chlorine, bromine, fluorine or iodine, and Y is an electron-withdrawing radical not a member of the above group, that is, neither a formyl nor a ketonic radical. By employing these reactants, we have unexpectedly found that we can obtain a Darzens-type reaction that yields a polyepoxy structure without the preparation of the undesirable by-products that characterize the Darzens condensation.

For the epoxy reactant, we employ compounds which are characterized by their possession of the vicinal epoxy ring

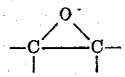

and by having a carbonylic substituent selected from the group of monovalent radicals consisting of formyl and ketonic radicals, that is, radicals having the structure

where R is either the hydrogen atom or a monovalent hydrocarbyl radical. These compounds are generally referred to as epoxyaldehydes and epoxy ketones, and may be prepared by epoxidation of the olefinic double bonds of unsaturated aldehydes and ketones.

Examples of unsaturated aldehydes and ketones which may be epoxidized to yield the epoxy compounds of this invention include methacrolein, crotonaldehyde, tiglic aldehyde, citral cinnamaldehyde, and other aldehydes having one alpha,beta-olefinic double bond. Also included are epoxyaldehydes of unsaturated aldehydes having one or more double bonds further removed from the formyl group, such as vinyl acetaldehyde, 3-pentenal, 4-pentenal, methyl vinyl acetaldehyde, isopropenyl acetaldehyde, citronellal, rhodinal, and 2-phenyl-4-hexenal. Of these compounds, the alpha,beta-monoepoxyaldehydes are preferred both because of their considerable reactivity and because of the desirable nature of the diepoxy products of the invention. The most preferred alpha,beta-monoepoxyaldehyde is glycidaldehyde, that aldehyde prepared by the epoxidation of acrolein.

Equally suitable as epoxy carbonylic reactants in the process of our invention are epoxy ketones. As in the case of epoxyaldehydes, epoxy ketones are synthesized by epoxidation of unsaturated ketones. Examples of suitable ketones include methyl vinyl ketone, ethyl allyl ketone, mesityl oxide, allyl phenyl ketone, phorone, and the like. Preferred epoxy ketones are those wherein oxygen atoms of the epoxy ring are connected to the alpha and beta carbon atoms with respect to the carbonylic carbon atom.

Cyclic epoxyaldehydes and ketones are also contemplated in the present invention. Such compounds may readily be prepared by the epoxidation of unsaturated cyclic aldehydes and ketones. Thus, cyclohexanones may be epoxidized to various epoxycyclohexanones which are operable in our process.

These epoxyaldehydes or ketones are reacted in our process with halomethyl compounds having the formula

where, as noted above, X is a halogen atom, R is a monovalent radical selected from the class consisting of the hydrogen atom and hydrocarbyl radicals, and Y is an electron-withdrawing radical, not a formyl or a ketonic radical. By electron-withdrawing radical, we mean a radical capable of attracting the electrons of the carbon atom to which the radical is connected so as to activate the carbon atom. By virtue of this property, these radicals are also termed alpha-activating, since they activate the carbon atom alpha to themselves and to which they are connected. These radicals and their properties are described extensively in the literature, as for example, by H. Gilman, Organic Chemistry, An Advanced Treatise, volume II, pages 1845–1847 (2d Ed., 1943). Examples of such electron-inductive radicals include the radicals —CN,

where R is selected from the group of monovalent radicals consisting of the hydrogen atom and hydrocarbyl radicals,

and the aryl radicals Ar. By aryl radicals we mean to include not only phenyl, —C$_6$H$_5$, but also substituted phenyl radicals as the p-nitrophenyl, o-alkyl phenyl and the naphthyl and substituted naphthyl radicals.

Thus far, the compound $$\underset{\underset{H}{|}}{X\overset{R}{\overset{|}{C}}Y}$$

has been described in terms of the methylene group —CH$_2$—. We wish, however, to include within the scope of the invention compounds wherein the substituents X and Y have the meanings described above, and R is a hydrocarbyl radical such as alkyl, phenyl, naphthyl, or the like. Of these, we prefer to employ as substituents the lower alkyl radicals such as methyl, ethyl, propyl and butyl, since by using these in place of hydrogen the reaction will proceed as smoothly. Examples of such substituted compounds include methyl benzyl chloride, ethyl-2-bromopropionate, 3-iodobutyric acid, and the like.

Other examples of the compounds designated by the structure $$\underset{\underset{H}{|}}{X\overset{R}{\overset{|}{C}}Y}$$

when Y is —CN, are such haloacetonitriles as chloroacetonitriles and bromoacetonitrile. When Y is

exemplary compounds are bromoacetamide and iodoacetamide. When Y is

examples of operative compounds are chloroacetic acid, methyl bromoacetate, and phenyl iodoacetate, R preferably including alkyl radicals having from 1 to 8 carbon atoms, and phenyl and substituted phenyl radicals.

The reactants may be brought together in any proportions, and we have found that the reaction will proceed satisfactorily at from about 10 moles of epoxaldehyde or ketone to 1 of the halomethyl compound to 10 of the halomethyl compound to 1 of the epoxyaldehyde or ketone.

We have found, however, that the reaction is most suitably conducted when the halomethyl compound is present in proportions which range from approximately stoichiometric, that is, one mole of the epoxyaldehyde or ketone for every mole of the (XCH$_2$) group, to proportions wherein about 1.5 moles of the (XCH$_2$) group are employed for every mole of the epoxy reactant.

The reaction is most suitably conducted in the presence of a reaction catalyst which comprises a basic condensing agent. Such compounds are well known to the art. One particularly useful class of basic condensation agents, and that preferred in this invention, is the reaction product obtained by the reaction of an alkali metal, e.g., sodium or potassium, with an alkanol such as ethanol and methanol. The compounds are known as alkali metal alkylates or alkoxides, and include sodium ethoxide, potassium methoxide, sodium propoxide, and potassium tert-butoxide. Also suitable as basic condensation agents are the metal hydrides, e.g., NaH, KH, and LiH. Other useful condensing agents include alkali metal amides and cyanides, e.g., sodium and potassium amides, and sodium cyanide. Such other condensing agents as diethylamine, sodium acetate, and the alkali metal salts of malonic acid may also be used. These catalysts are preferably employed in molar amounts corresponding to that of the halomethyl compound.

We have found that unless the reaction is conducted under anhydrous conditions, the hydrogen halide product attacks the epoxy rings of the epoxy reactant and polyepoxy product. It is therefore necessary that the reaction be conducted under strictly anhydrous conditions. This may be achieved by conducting the reaction without the use of solvents, or by using an inert solvent which is not miscible with water. Examples of such solvents are the paraffins which are liquids at the temperature of reaction, as well as benzene, toluene, xylene, and the like.

The reaction is a vigorous one, once the catalyst has been added, and may therefore be conducted at low temperatures to minimize attack on the epoxy rings formed. A temperature range of from about —20° C. to about 10° C. is therefore preferred, while the best yields are obtained when the reaction is conducted between about —10° C. and 0° C. These reaction temperatures are readily achieved through the use of ice baths, Dry Ice-solvent baths, and other well-known methods.

The reactants and products may, at the termination of the reaction, readily be separated by vacuum distillation. The nature of the products will, of course, be determined by the structure of the reactants. For example, when the preferred alpha, beta-epoxyaldehydes or ketones are reacted with halomethyl compounds having the formula XCH$_2$Y under the conditions of our process, the resulting product will be one in which one carbon atom of one epoxy group is directly connected to a carbon atom of another epoxy group. The structure of such products may therefore be

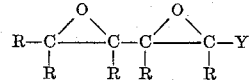

where R denotes the substituents of the epoxy reactant, and therefore may be selected from the group consisting of hydrogen and hydrocarbyl radicals. When, however, the epoxy group is not on the alpha and beta carbons of the epoxy carbonylic reactant, the epoxy rings of the product will not be adjacent.

The following examples will serve to illustrate the nature of our process and of our novel compounds. It should be understood, however, that the examples are merely illustrative and are not to be regarded as limitations on the appended claims, since the basic teachings therein may be varied at will as will be understood by one skilled in the art. In the examples, the ingredients are expressed in parts by weight unless otherwise indicated.

*Example 1.—Preparation of 3,5-dimethyl-2,3,4,5-diepoxy hexanoate*

One mole of mesityl oxide epoxide and 1.3 moles of ethyl chloroacetate were reacted in the presence of 1.3 moles of sodium ethylate. The reaction mixture was stirred for six hours while maintained at about —10° C. and then allowing the temperature to rise slowly to about 20°. At the end of that time, the reaction mixture was washed with ice water and extracted with ether. After removal of the ether, the product was vacuum distilled to separate its components.

In this manner, 135 parts of 3,5-dimethyl-2,3,4,5-diepoxy hexanoate were recovered, a 67.5% yield. This product was a liquid having a boiling point after redistillation of 104° C. at 3 mm. and a refractive index of 1.4407. Upon analysis, the following data were obtained:

| Percent | C | H | Epoxy Value, eq./100 g. | Ester Value, eq./100 g. |
|---|---|---|---|---|
| Calculated for $C_{10}H_{16}O_4$ | 60.0 | 8.1 | 1.00 | 0.50 |
| Found | 60.1 | 8.1 | 0.273 | 0.50 |

These data corresponded to a compound having the structure $$\underset{CH_3}{\overset{CH_3}{C}}\overset{O}{\underset{\diagdown\diagup}{}}\overset{}{C}-\underset{H}{\overset{}{C}}-\overset{O}{\underset{\diagdown\diagup}{}}\overset{}{C}-\underset{H}{\overset{CH_3}{C}}-\overset{O}{\overset{\|}{C}}-OC_2H_5$$

*Example II.*—Preparation of 2,3,4,5-diepoxy pentanoate

As in the previous example, 72 parts of anhydrous glycidaldehyde were reacted with 140 parts of ethyl chloroacetate in the presence of 80 parts of sodium ethoxide at −10° C. Upon vacuum distillation, 64 parts or a 48% yield of 2,3,4,5-diepoxy pentanoate was obtained. The redistilled ester had a boiling point of 124°–125° C. at 5 mm. and a refractive index of 1.4553, and upon analysis the following data were obtained:

| Percent | C | H | Epoxy Value, eq./100 g. | Ester Value, eq./100 g. |
|---|---|---|---|---|
| Calculated for $C_7H_{10}O_4$ | 53.1 | 6.34 | 1.26 | 0.64 |
| Found | 52.6 | 6.4 | 0.66 | 0.65 |

These data corresponded to a compound having the structure $$H_2C\overset{O}{\underset{\diagdown\diagup}{}}\underset{H}{\overset{}{C}}-\underset{H}{\overset{}{C}}-\overset{O}{\underset{\diagdown\diagup}{}}\underset{}{\overset{}{C}}-\underset{H}{\overset{}{C}}-\overset{O}{\overset{\|}{C}}-OC_2H_5$$

*Example III.*—Preparation of diepoxy hexyl nitrile

By reacting one mole of chloroacetonitrile with about 1.5 moles of 2,3-epoxypentanal under anhydrous conditions at 0° C. and in the presence of 1 mole of sodium hydride, an excellent yield of 2,3,4,5-diepoxy hexyl nitrile may be obtained.

*Example IV.*—Preparation of diepoxy butyramide

Conducting the reaction of glycidaldehyde and bromoacetamide, in equimolar proportions, at −5° C. under anhydrous conditions and in the presence of about a mole of sodium amide yields 2,3,4,5-diepoxy butyramide in good yield.

*Example V.*—Preparation of phenyl diepoxy butane

When 1.3 moles of benzhydryl chloride are reacted under anhydrous conditions at 0° C. with about a mole of glycidaldehyde in the presence of about a mole of potassium tert-butoxide, 1,1-diphenyl-1,2,3,4-diepoxy butane is obtained.

*Example VI.*—Preparation of p-nitrophenyl diepoxy butane

One and four-tenths moles of alpha-chloro-p-nitrotoluene and one mole of glycidaldehyde are added over the course of the reaction to 1.4 moles of potassium tert-butoxide under anhydrous conditions at 0° C.; p-nitrophenyl-1,2,3,4-diepoxy butane, having the formula $$H_2C\overset{O}{\underset{\diagdown\diagup}{}}CH-CH\overset{O}{\underset{\diagdown\diagup}{}}CH-C_6H_4-NO_2$$

is obtained in good yield.

We claim as our invention:

1. The diepoxy compound comprising an alkane chain having up to 12 carbon atoms, having two vicinal epoxy groups disposed on said chain, one of said epoxy groups including the alpha and beta carbon atoms and the other epoxy group including the gamma and delta carbon atoms, and having attached to the alpha carbon atom of the chain a monovalent radical selected from the group consisting of the —CN, $$-\overset{O}{\overset{\|}{C}}-OR, -\overset{O}{\overset{\|}{C}}-NH_2$$

phenyl and p-nitrophenyl radicals, wherein R is an alkyl radical having up to 8 carbon atoms.

2. The diepoxy compound of claim 1 wherein the radical attached to the alpha carbon atom is the phenyl radical.

3. The diepoxy compound of claim 1, wherein the radical attached to the alpha carbon atom is $$-\overset{O}{\overset{\|}{C}}-NH_2$$

4. The diepoxy compound of claim 1 wherein the radical attached to the alpha carbon atom is $$-\overset{O}{\overset{\|}{C}}-OR$$

R being alkyl having up to 8 carbon atoms.

5. The diepoxy compound of claim 1 wherein the radical attached to the alpha carbon atom is —CN.

6. The diepoxy compound of claim 1, wherein the radical attached to the alpha carbon atom is the p-nitrophenyl radical.

7. Ethyl-2,3,4,5-diepoxypentanoate.

References Cited in the file of this patent
UNITED STATES PATENTS 2,764,497    Mika                 Sept. 25, 1956

FOREIGN PATENTS 1,131,891    France                Feb. 28, 1957

OTHER REFERENCES

Bodforss: Berichte 49, 1916, pages 2795–2801.

Boeseken: Proc. Aca. Sci. Amsterdam, 32, 1929, pages 337–79.

Gilman: Organic Chemistry, vol. II, 2nd Edition, pp. 1845–1847 (1943).

Hendry et al.: Brit, J. Pharm., vol. 6, p. 244 (1951).

Koller: Heredity 6 (Supplement) (1953), page 181.

Newman: Organic Reactions 5, pages 418 and 438.

Notice of Adverse Decision in Interference

In Interference No. 93,218 involving Patent No. 2,980,707, P. H. Williams and W. J. Sullivan, 2,3,4,5-Diepoxy compounds, final judgment adverse to the patentees was rendered Nov. 18, 1964, as to claims 4 and 7.

[*Official Gazette January 19, 1965.*]